(12) United States Patent
Morrell

(10) Patent No.: US 12,076,767 B2
(45) Date of Patent: Sep. 3, 2024

(54) SOLID WASTE TREATMENT SYSTEM AND METHOD

(71) Applicant: GFL EVIRONMENTAL SERVICES INC., Vaughan (CA)

(72) Inventor: Colin Morrell, Enfield (CA)

(73) Assignee: GFL Environmental Services Inc., Vaughan (CA)

( * ) Notice: Subject to any disclaimer, the term of this patent is extended or adjusted under 35 U.S.C. 154(b) by 0 days.

(21) Appl. No.: 17/883,455

(22) Filed: Aug. 8, 2022

(65) Prior Publication Data
US 2022/0371064 A1    Nov. 24, 2022

Related U.S. Application Data

(63) Continuation of application No. 16/723,250, filed on Dec. 20, 2019, now Pat. No. 11,541,438, which is a
(Continued)

(30) Foreign Application Priority Data

Jun. 23, 2017   (AU) .................................. 2017902433

(51) Int. Cl.
*B09B 3/80*       (2022.01)
*B01D 11/02*      (2006.01)
(Continued)

(52) U.S. Cl.
CPC .............. *B09B 3/80* (2022.01); *B01D 11/028* (2013.01); *B01D 11/0292* (2013.01); *B03B 7/00* (2013.01);
(Continued)

(58) Field of Classification Search
CPC .... B09B 3/80; B09B 3/40; B09B 3/70; B01D 11/028; B01D 11/0292; B01D 11/00;
(Continued)

(56) References Cited

U.S. PATENT DOCUMENTS

| 772,331 A | 10/1904 | Baxter et al. |
| 1,284,872 A | 11/1918 | Bryan |

(Continued)

FOREIGN PATENT DOCUMENTS

| CA | 2367544 | 7/2003 |
| DE | 4210948 | 10/1993 |

(Continued)

OTHER PUBLICATIONS

English Translation of Cappel et al Publication EP313116B1, published Aug. 1993. (Year: 1993).*

(Continued)

*Primary Examiner* — Joseph W Drodge
(74) *Attorney, Agent, or Firm* — Rutan & Tucker LLP

(57) ABSTRACT

A waste treatment system for separating contaminants including per-fluoroalkyl and poly-fluoroalkyl substances (PFAS) from bulk solid waste (12). A preparation module (9) having a bulk material separator separates oversize material (14) from bulk solid waste (12). A physical separation module (13), located down-stream of the preparation module (9), separates the bulk solid waste (12) based on particle size using physical and/or hydrodynamic and/or density separation techniques. An extraction/chemical separation module (19), located downstream of the physical separation module (13), adds leachate and/or extractant to separate the contaminants from a slurry output from the physical separation module (13), into a fines output and a contaminated water solution. A water circulation system (21) supplies water to the physical separation module (13) and the extraction/chemical separation module (19), the water circulation system including at least one water treatment process, the treated water being recycled and recirculated within the waste treatment system.

7 Claims, 3 Drawing Sheets

Related U.S. Application Data continuation-in-part of application No. PCT/AU2018/050620, filed on Jun. 22, 2018.

(51) Int. Cl.

| | | |
|---|---|---|
| *B03B 7/00* | (2006.01) | |
| *B03B 9/06* | (2006.01) | |
| *B09C 1/08* | (2006.01) | |
| *C02F 1/00* | (2023.01) | |
| *C02F 1/44* | (2023.01) | |
| *C02F 11/12* | (2019.01) | |
| *C02F 11/122* | (2019.01) | |

(52) U.S. Cl.
CPC ............... *B03B 9/06* (2013.01); *B09C 1/08* (2013.01); *C02F 1/004* (2013.01); *C02F 1/441* (2013.01); *C02F 11/122* (2013.01); *C02F 2303/16* (2013.01)

(58) Field of Classification Search
CPC ..... B01D 11/02; B01D 11/0288; B01D 11/04; B01D 11/0488; B01D 11/0492; B01D 21/00; B01D 21/009; B01D 21/01; B01D 21/26; B01D 21/267; B01D 29/66; B01D 29/68; B01D 36/00; B01D 36/02; B01D 36/04; B01D 61/02; B01D 61/025; B01D 61/04; B01D 2311/04; B01D 2311/26; B01D 2311/2642; B01D 2311/2676; B03B 7/00; B03B 9/06; B03B 1/00; B03B 1/02; B03B 1/04; B03B 5/00; B03B 5/48; B03B 5/52; B03B 5/62; B03B 5/66; B03B 9/00; B03B 9/061; B03B 9/063; B03B 9/067; B03B 9/068; B03B 11/00; C02F 1/004; C02F 1/441; C02F 11/122; C02F 2303/16; C02F 1/02; C02F 1/26; C02F 1/38; C02F 1/44; C02F 1/52; C02F 1/5209; C02F 9/00; C02F 11/12; C02F 11/121; C02F 11/123; C02F 11/13; C02F 11/14; C02F 11/18; B09C 1/025; B09C 1/08; B09C 1/02; B09C 1/00; B03D 1/00; B03D 1/02; B03D 3/00; B03D 3/02; B03D 3/06; B03D 2203/008

See application file for complete search history.

(56) References Cited

U.S. PATENT DOCUMENTS

| | | |
|---|---|---|
| 2,514,958 A | 7/1950 | Lee |
| 2,760,635 A | 8/1956 | Dahlstrom |
| 3,897,330 A | 7/1975 | Rhys |
| 4,234,448 A | 11/1980 | Hirano et al. |
| 4,293,438 A | 10/1981 | Ledebrink et al. |
| 4,478,710 A | 10/1984 | Smucker et al. |
| 4,614,579 A | 9/1986 | Dorph |
| 4,737,315 A | 4/1988 | Suzuki et al. |
| 4,772,384 A | 9/1988 | Schonert et al. |
| 4,783,253 A | 11/1988 | Ayres et al. |
| 4,923,125 A | 5/1990 | Bateson et al. |
| 4,969,775 A | 11/1990 | Cappel et al. |
| 4,975,198 A | 12/1990 | Steiner |
| 5,009,370 A | 4/1991 | Mackenzie |
| 5,045,240 A | 9/1991 | Skriba et al. |
| 5,056,541 A | 10/1991 | Schade et al. |
| 5,087,370 A | 2/1992 | Schultheis et al. |
| 5,128,068 A | 7/1992 | Lahoda et al. |
| 5,158,238 A | 10/1992 | Lehman |
| 5,203,212 A | 4/1993 | Bovendeur et al. |
| 5,266,494 A | 11/1993 | Lahoda et al. |
| 5,268,128 A | 12/1993 | Lahoda et al. |
| 5,300,258 A | 4/1994 | Grant et al. |
| 5,316,223 A | 5/1994 | Lahoda et al. |
| 5,342,449 A | 8/1994 | Holbein et al. |
| 5,372,650 A | 12/1994 | Lahoda et al. |
| 5,465,847 A | 11/1995 | Gilmore |
| 5,573,738 A | 11/1996 | Ma et al. |
| 5,599,372 A | 2/1997 | Pommier |
| 5,772,776 A | 6/1998 | Holbein |
| 5,829,691 A | 11/1998 | Gaudin |
| 5,855,691 A | 1/1999 | Oram et al. |
| 6,102,053 A | 8/2000 | Van De Steeg et al. |
| 6,139,485 A | 10/2000 | Pal et al. |
| 6,217,775 B1 | 4/2001 | Conca et al. |
| 6,915,908 B2 | 7/2005 | Bergeron |
| 6,962,466 B2 | 11/2005 | Vinegar et al. |
| 7,255,514 B2 | 8/2007 | Benjamin et al. |
| 7,399,141 B2 | 7/2008 | Benjamin et al. |
| 11,541,438 B2 * | 1/2023 | Morrell ............... C02F 1/441 |
| 2004/0082828 A1 | 4/2004 | Bergeron |
| 2009/0032442 A1 | 2/2009 | Singh et al. |
| 2012/0277516 A1 | 11/2012 | Ball |
| 2013/0316433 A1 * | 11/2013 | Huang ............... B09C 1/10 |
| | | 435/189 |
| 2014/0246366 A1 * | 9/2014 | Kerfoot ............... C02F 1/722 |
| | | 210/170.07 |
| 2015/0258552 A1 | 9/2015 | Warkentin et al. |
| 2015/0274556 A1 | 10/2015 | Church et al. |
| 2016/0304376 A1 | 10/2016 | Venkatesan et al. |
| 2018/0319685 A1 | 11/2018 | Ball et al. |
| 2019/0176163 A1 | 6/2019 | Valerio |
| 2019/0241452 A1 * | 8/2019 | Ball ............... C02F 1/722 |

FOREIGN PATENT DOCUMENTS

| | | | |
|---|---|---|---|
| DE | 3908185 | 9/1997 | |
| DE | 3928427 | 8/1999 | |
| EP | 0460828 | 5/1991 | |
| EP | 313116 B1 * | 8/1993 | ............... B09B 3/80 |
| EP | 0789240 | 8/1997 | |
| GB | 2481985 | 1/2012 | |
| JP | 2003-266054 | 9/2003 | |

OTHER PUBLICATIONS

International Preliminary Report for PCT/AU2018/050620 mailed Jul. 17, 2018.

International Search Report for PCT/AU2018/050620 mailed Jul. 17, 2018.

Interstate Technology and Regulatory Council Small Arms Firing Range Team, "Characterization and Remediation of Soils at Closed Small Arms Firing Ranges", Technical/Regulatory Guidelines, 204 pages, Jan. 2003.

Zane Satterfield, P.E., NESC Engineering Scientist, "Filter Backwashing", Tech Brief, The National Environmental Science Center at West Virginia University, 4 pages, Fall 2005.

Pancras et al., "Environmental Fate and Effects of Poly-and Perfluoroalkyl Substances (PFAS),", Report No. 8/16, Concawe Soil and Groundwater Taskforce, 121 pages, Jun. 2016.

Battelle, "Technology Application Analysis, Physical Separation and Acid Leaching, a Demonstration of Small-Arms Range Remediation at Fort Polk, Louisiana", Naval Facilities Engineering Service Center, 51 pages, Feb. 1998.

Deborah Squire, "Reverse Osmosis Concentrate Disposal in the UK", Conference on Membranes in Drinking and Industrial Water Production, 8 pages, Oct. 2000.

Brad Christensen, M. Same, "Innovative Cleanup Technologies", The Military Engineer (TME), Society of American Military Engineers, vol. 103, No. 669, 3 pages, Jan.-Feb. 2011, pp. 57-58.

Great Lakes Confined Disposal Facilities, Department of the Army—US Army Corps of Engineers, U.S. Environmental Protection Agency, Apr. 2003, 70 pp.

Treatment of Lead Contaminated Soils, Superfund Engineering Issue, U.S. Environmental Protection Agency, EPA 540/2-91/009, Apr. 1991, 10 pp.

(56) References Cited

OTHER PUBLICATIONS

Demonstration of Physical Separation/Leaching Methods for the Remediation of Heavy Metals Contaminated Soils at Small Arms Ranges, United States Department of Defense by BDM; Final Report U.S. Army Environmental Center, Sep. 1997, 292 pp.
Guide for Conducting Treatability Studies Under CERCLA: Soil Washing, Interim Guidance, U.S. Environmental Protection Agency, EPA/540/2-91/020A, Sep. 1991, 46 pp.
Liquid Humates with 12% Humic Acid, 2 pp., Distributed by Agriculture Solutions Inc., www.agriculturesolutions.ca, Canada.
Metals and Alloys—Densities, The Engineering ToolBox, https://www.EngineeringToolBox.com/metal-alloys-densities-d_50.html, retrieved Jun. 15, 2022, 7 pp.
Planning for environmental restoration of radioactively contaminated sites in central and eastern Europe, vol. 3: Technologies for, and the implementation of, environmental restoration of contaminated sites; Internatinal Atomic Energy Agency, IAEA-TECDOC-865, 1994, 282 pp.
Soil Washing Treatment, Engineering Bulletin, U.S. Environmental Protection Agency, EPA/540/2-90/017; Sep. 1990, 10 pp.
Specific Gravity of Solids, https://www.elementaryengineeringlibrary.com/civil-engineering/soil-mechanics/specific-gravity-of-solids, retrieved Jun. 14, 2022, 5 pp.
Adriano, et al., "Role of Soil Chemistry in Soil Remediation and Ecosystem Conservation", Soil Chemistry and Ecosystem Health, Soil Science Society of America, Special Publication No. 52;1998, pp. 361-386, WI USA.
Bostick et al., "Use of Apatite for Chemical Stabilization of Subsurface Contaminants", U.S. Department of Energy, Final Report, DE-AC26-01NT41306, May 2003, 195 pp.
Bovendeur J., "The FingerPrint Method—A Practical Tool in Linking Characterization and Treatment of Polluted Soil and Sediments", Fourth International KfK/TNO Conference on Contaminated Soil, Contaminated Soil '93, vol. 1, 7 pp., May 3-7, 1993, Kluwer Academic Publishers, Berlin Germany.
Bovendeur J., et al., "Characterization and Treatment of Polluted Material—An Environmental Application of Mineral Processing Technology", IVIII International Mineral Processing Congress, May 23-28, 1993, pp. 1267-1270, Sydney, Australia.
Environmental Security Technology Certification Program (ESTCP) Cost and Performance Report (ER-0020), PMIS: Remediation of Soil and Groundwater Contaminated With Metals, U.S. Department of Defense, Jun. 2006, 58 pp.
Environmental Security Technology Certification Program (ESTCP) Final Report for ESTCP Project CU-200020, PIMS: Remediation of Soil and Groundwater Contaminated With Metals, PIMS Remediation of Soil Contaminated with Lead at Camp Stanley Storage Activity, U.S. Department of Defense, Aug. 2003, 603 pp.
Feenstra L., et al., "A Standard Method for Characterization Contaminated Soil and Sediment for Processing With Particle Separation Techniques", Fifth International FZK/TNO Conference on Contaminated Soil, Contaminated Soil '95, vol. II, 11 pp., Netherlands. Published 1995.
Implementation Guidance Handbook—Physical Separation and Acid Leaching to Process Small-Arms Range Soils—Final, Sep. 18, 1997, 120 pp., Battelle; Columbus OH.
Final Technology Evaluation Report vol. 1:Physical Separation and Acid Leaching: A Demonstration of Small-Arms Range Remediation at Fort Polk, Louisiana, (ESTCP), Sep. 22, 1997, 148 pp., Battelle; Columbus OH.
Final Technology Evaluation Report vol. II, Physical Separation and Acid Leaching: A Demonstration of Small-Arms Range Remediation at Fort Polk, Louisiana, (ESTCP), Sep. 22, 1997, 314 pp., Battelle; USA.
Fristad W., "Case Study: Using Soil Washing/Leaching for Removal of Heavy Metal at Twin Cities Army Ammunition Plant", Remediation Journal/Autumn 1995, pp. 61-72, John Wiley & Sons, Inc.
Ghosh U., et al., "Microscale Location, Characterization, and Association of Polycyclic Aromatic Hydrocarbons on Harbor Sediment Particles", Environmental Science and Technology., vol. 34, No. 9, 2000, pp. 1729-1736, American Chemical Society.
Gokyay O., "An Application of Soil Washing Method for the Remediation of Contaminated Soils by Mining Activities", T.C. Marmara University Institute for Graduate Studies in Pure and Applied Sciences, 2001, 15 pp., Istanbul.
Griffiths R., "Soil-Washing Technology and Practice", Journal of Hazardous Materials, 40 (1995), pp. 175-189, Elsevier, USA.
Hodson M., et al., "Bonemeal Additions as a Remediation Treatment for Metal Contaminated Soil", Environmental Science & Technology, vol. 34, No. 16, 2000, pp. 3501-3507, American Chemical Society.
Hoefffner S., "Technical Progress Report: Technical Evaluation of Remediation Technologies for Plutonium-Contaminated Soils at Nevada Test Site (NTS)", Clemson Environmental Technologies Laboratory, DE-FC26-00NT40841, Mar. 23, 2004, 168 pp.
Hong A., et al., "Extraction, Recovery, and Biostability of EDTA for Remediation of Heavy Metal-Contaminated Soil", Journal of Soil Contamination 8(1); 1999, pp. 81-103.
Huat B., et al., "Experimental Investigation on Geomechanical Properties of Tropical Organic Soils and Peat", American J. of Engineering and Applied Sciences, 2 (1), 2009, pp. 184-188.
Technical/Regulatory Guidelines, Characterization and Remediation of Soils at Closed Small Arms Firing Ranges, Interstate Technology and Regulatory Council, Jan. 2003, 187 pp.
Mann M.J., "Full-Scale and Pilot-Scale Soil Washing", Journal of Hazardous Materials, 66 (1999) pp. 119-136, Elsevier Science B.V.
Mann, et al., "Innovative Site Remediation Technologies: Design and Application, Liquid-Extraction-Technologies, Soil Washing, Soil Flushing, Solvent/Chemical", U.S. Environmental Protection Agency, vol. 3; EPA 542-B-97-006; May 1998; 472 pp.
Mason F.V., et al., "A Complete Remediation Process for a Uranium-Contaminated Site and Application to Other Sites", Los Alamos National Laboratory, May 3, 1999, 24 pp.
Matthiessen A., "On the Specific Gravity of Alloys", Philosophical Transactions of the Royal Society of London, 1860, vol. 150, pp. 177-184, The Royal Society Publishing.
Morizot G.J.P., "Mineral Processing Technology Applied to the Remediation of Contaminated Soils", Mineral Processing and the Environment, 1998, pp. 313-334, Kluwer Academic Publishers.
Myers T., et al., "Confined Disposal Facility Reclamation Research", Oct. 2003, 15 pp., retrieved Jun. 3, 2014., https://www.researchgate.net/publication/228798876.
Olin T.J., et al., "Physical Separation (Soil Washing) for Volume Reduction of Contaminated Soils and Sediments Processes and Equipment", U.S. Environmental Protection Agency, EPA-905-R-99-006, Sep. 1999, 141 pp.
Olin-Estes T.J., et al., "Recovery of Dredged Material for Beneficial use: the Future Role of Physical Separation Processes", Journal of Hazardous Materials, 85 (2001), pp. 39-51, Elsevier.
Petruzzelli et al., "Bench Scale Evaluation of Soil Washing for Heavy Metal Contaminated Soil at Former Manufactured Gas Plant Site", Bull. Environ. Contam. Toxicol, (2004) 73, pp. 38-44; Springer-Verlag New York, LLC.
Porter R.D., et al., "Treatment Methods and Comparative Risks of Thorium Removal from Waste Residues", University of Michigan, Department of Environmental and Industrial Health; DE-FG05-96EW00001; (DOE/EW/00001-T2-Pt.), Jul. 1997, 50 pp.
Site Remediation Technology InfoBase: A Guide to Federal Programs, Information Resources, and Publication on Contaminated Site Cleanup Technologies, Second Edition, U.S. Environmental Protection Agency, EPA 542-B-00-005, Jun. 2000, 83 pp.
Sobieraj J.A., et al., "Survey: Bioremediation Contractors Guarantee Performance", Remediation Journal, The Journal of Environmental Cleanup Costs, Technologies & Techniques, vol. 5, No. 4, 1995, 133 pp., John Wiley & Sons, Inc.
Specific Gravity Table for Metal, Minerals & Ceramics, 2022 READE International Corp., Riverside RI, USA. 5 pp.
Tardy et al., "Chemical Stabilization of Lead in Small Arms Firing Range Soils", Environmental Quality and Technology Program, ERDC/EL TR-03-20, Environmental Laboratory, US Army Corps of Engineers Engineer Research and Development Center, Sep. 2003, 66 pp.

(56) References Cited

OTHER PUBLICATIONS

Technology Application Analysis, Physical Separation and Acid Leaching a Demonstration of Small Arms Range Remediation at Fort Polk, Louisiana, Sep. 18, 1997, 53 pp.

Technology Application Analysis, Physical Separation and Acid Leaching, a Demonstration of Small-Arms Range Remediation for Fort Polk, Louisiana, NFESC and USAEC, Contract Report CR 98.011-ENV, Feb. 18, 1998; 51 pp., Battelle; Columbus OH.

Warminsky M., et al., "Innovative Application of Environmental Technology Simplifies Rapid Response Action Soil Cleanup at MMR", Proceedings of the 27th Environmental & Energy Symposium & Exhibition, National Defense Industrial Association, Jan. 2001, pp. 1-8.

Wong W.W.Y., "Investigation of the Geotechnical Properties of Municipal Solid Waste as a Function of Placement Conditions", Thesis, M.S.E. in Civil and Environmental Engineering, California Polytechnic State University, San Luis Obispo, CA, Sep. 2009, 151 pp.

Wright J., et al., "PIMS Using Apatite II: How it Works to Remediate Soil and Water", Proceedings of the Conference on Sustainable Range Management—2004, 8pp., Jan. 5-8, New Orleans, Battelle Memorial Institute, Columbus OH.

Yesiller N., et al., "Determination of specific gravity of municipal solid waste", Waste Management, 34 (5), May 2014, pp. 848-858, California Polytechnic State University, San Luis Obispo, CA.

Corden F.L., et al., "Soil Washing: From Characterization to Implementation", 1995, 6 pp.

Groenendijk E., et al., "Soil Washing as a 'Tailor Made' Solution for Treatment of Lead Paint Manufacturing Contaminated Soils", I&EC Special Symposium, American Chemical Society, Atlanta GA. Sep. 17-20, 1995; 4 pp.

\* cited by examiner

SOLID WASTE TREATMENT SYSTEM AND METHOD

TECHNICAL FIELD

The present disclosure relates to a solid waste treatment system and method. The present invention relates to a system and method for removing per-fluoroalkyl and poly-fluoroalkyl substances (PFAS) from contaminated solid waste such as soil, sediment, concrete or other contaminated solid waste. However, it will be appreciated by those skilled in the art that the present invention may be used to remove other contaminants from solid waste.

BACKGROUND OF THE INVENTION

Per-fluoroalkyl and poly-fluoroalkyl substances (PFAS) are a diverse group of manufactured compounds which are not naturally occurring in the environment. PFAS are a group of fluorinated organic compounds that were invented in 1938 and used heavily within several industries from 1950 to about 2000 when phase out of several PFAS compounds began due to health concerns. Perfluorooctane sulfonate (PFOS) and perfluorooctanoic acid (PFOA) are two of the most well-known PFAS.

PFAS are resistant to heat, water, and oil. PFAS have been used in industrial applications and consumer products such as carpeting, apparel, upholstery, food paper wrappings and fire-fighting foams (aqueous film-foaming foams) and hydraulic fluid in aircraft.

In Australia there are several instances in which fire-fighting facilities and fire-fighting training grounds at airports have been found to be contaminated by PFAS. Solid waste contaminated with PFAS may result in contamination of ground water and related water courses.

Unfortunately PFAS are resistant to environmental degradation, meaning that without suitable treatment, they can persist in contaminated solid waste for extended periods of time. Studies indicate that continued exposure to sources of PFAS may result in bioaccumulation of PFAS in living organisms, meaning their concentration increases over time in the blood and organs. Exposure to certain PFAS have been linked to various adverse health effects.

Due to the chemical properties of PFAS (low volatility and resistance to biodegradation, photolysis and hydrolysis), there are limited remediation options currently available for treatment of PFAS contaminated solid waste (soil, sediment, spent media, concrete and all other PFAS impacted media). Available options include landfill disposal, encapsulation in purpose built lined repositories and thermal desorption.

Various methods have been considered and studied for removing contaminants including PFAS from solid waste. For example, physical barriers have been considered which physically prevent ground water movement out of a contaminated area. Whilst such approaches may have application in the containment of contaminants, they ultimately do not achieve local decontamination of the solid waste.

Removal and disposal of contaminated solid waste may be possible in small scale contamination sites, but this approach is expensive and the feasibility of the option is controlled by state or federal regulators who may remove such options.

Some thermal processes, such as high temperature plasma arcs, have been found to be successful in destroying PFAS. Alternatively, thermal desorption can be used to desorb contaminants by evaporation. The contaminants can then be condensed and collected or destroyed in a thermal oxidiser.

Whilst thermal processes may be applied to remove PFAS from solid waste, in practice these processes can be energy intensive, result in the production of highly corrosive by-products and are expensive.

Object of the Invention

It is an object of the present invention to substantially overcome or at least ameliorate one or more of the above disadvantages, or to provide a useful alternative.

SUMMARY OF THE INVENTION

In a first aspect, the present invention provides a per-fluoroalkyl and poly-fluoroalkyl substances (PFAS) waste removal system from bulk solid waste, the system comprising:
  a preparation module having a bulk material separator to separate oversize material from the bulk solid waste;
  a physical separation module, located down-stream of the preparation module, to separate the bulk solid waste based on particle size using physical and/or hydrodynamic and/or density separation techniques;
  an extraction/chemical separation module, located down-stream of the physical separation module, to add leachate and/or extractant to separate the contaminants from a slurry output from the physical separation module, into a fines output and a contaminated water solution; and
  a water circulation system supplying water to the preparation module and the physical separation module and the extraction/chemical separation module, the water circulation system including at least one water treatment process, the treated water being recycled and recirculated within the waste treatment system.

Process water added to the physical separation module is preferably heated above an ambient temperature and/or chemically amended.

Preferably wash-water and/or chemicals used in the extraction/chemical separation module are heated above an ambient temperature.

Preferably wash-water and/or chemicals used in the extraction/chemical separation module are modified by the addition of chemicals including surfactants, biosurfactants and/or solvents and/or poly-valent cations.

Wash-water and/or chemicals used in the extraction/chemical separation module are preferably pH modified. The pH is preferably in the range of 8-9.

Reverse osmosis is preferably used to generate de-ionised water for reuse as wash-water in the extraction/chemical separation module and/or the water circulation system.

The physical separation module preferably includes:
  a first linear screen deck configured to separate input slurry into output slurry and organic material having a size generally larger than about 1 mm; and
  a hindered settling classifier and a sieve bend located down-stream of the first linear screen deck and configured to separate organic material having a size of about 0.15 mm to 1 mm from the slurry.

The physical separation module further preferably includes a DAF or flotation cell to remove organic material smaller than 0.15 mm.

The physical separation module preferably includes a wet trommel screen down-stream of and in communication with the preparation module, the wet trommel screen having an oversize output, generally larger than about 50 mm, and a gravel slurry output.

The gravel slurry output is preferably directed into a coarse material washer, the coarse material washer having:
  a slurry containing fine sand, silt, clay output;
  an organic material output which is directed to the first linear screen deck; and
  a gravel, sand, silt and clay slurry output which is directed to a second linear screen deck.

The second linear screen deck preferably separates the gravel, sand, silt and clay slurry output into a gravel output and a slurry output, the slurry output being in fluid communication with an attrition scrubber.

The attrition scrubber preferably agitates an input liquid to disseminate solid waste particles, a downstream side of the attrition scrubber being in fluid communication with a cyclonic separator.

The cyclonic separator preferably has a cyclonic slurry output having a particle size of less than about 0.15 mm and a sandy slurry output which is in fluid communication with the hindered settling classifier.

The hindered settling classifier preferably has a sandy slurry output which is directed to a third linear screen deck.

The third linear screen deck preferably has a sand output being larger than about 0.15 mm in size and a water output, the water output being in fluid communication with a location upstream of the attrition scrubber.

The cyclonic slurry output preferably has a particle size of less than about 0.15 mm is in fluid communication with a polymer dispenser and an input port of a thickener.

The thickener preferably has a water output in fluid communication with a clarified water tank and a slurry outlet in fluid communication with a dewatering press, the clarified water tank being in fluid communication with a water treatment plant.

The dewatering press preferably has a press water outlet and a dewatered cake fines outlet, the press water outlet being in fluid communication with a filtrate water tank, the filtrate water tank being in fluid communication with the head of the thickener.

The waste treatment system further preferably comprises:
  at least one primary filter;
  at least one secondary filter; and
  a filtered water tank located in between the primary and secondary filters.

The waste treatment system further preferably comprises a treated water tank located down-stream of the secondary filter, the treated water tank being in fluid communication with a recycled water supply line for supplying water to the waste treatment system.

The treated water tank is preferably in fluid communication with a back wash pump, the back wash pump being in fluid communication with downstream sides of the secondary filter and the primary filter

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

Figure 1:
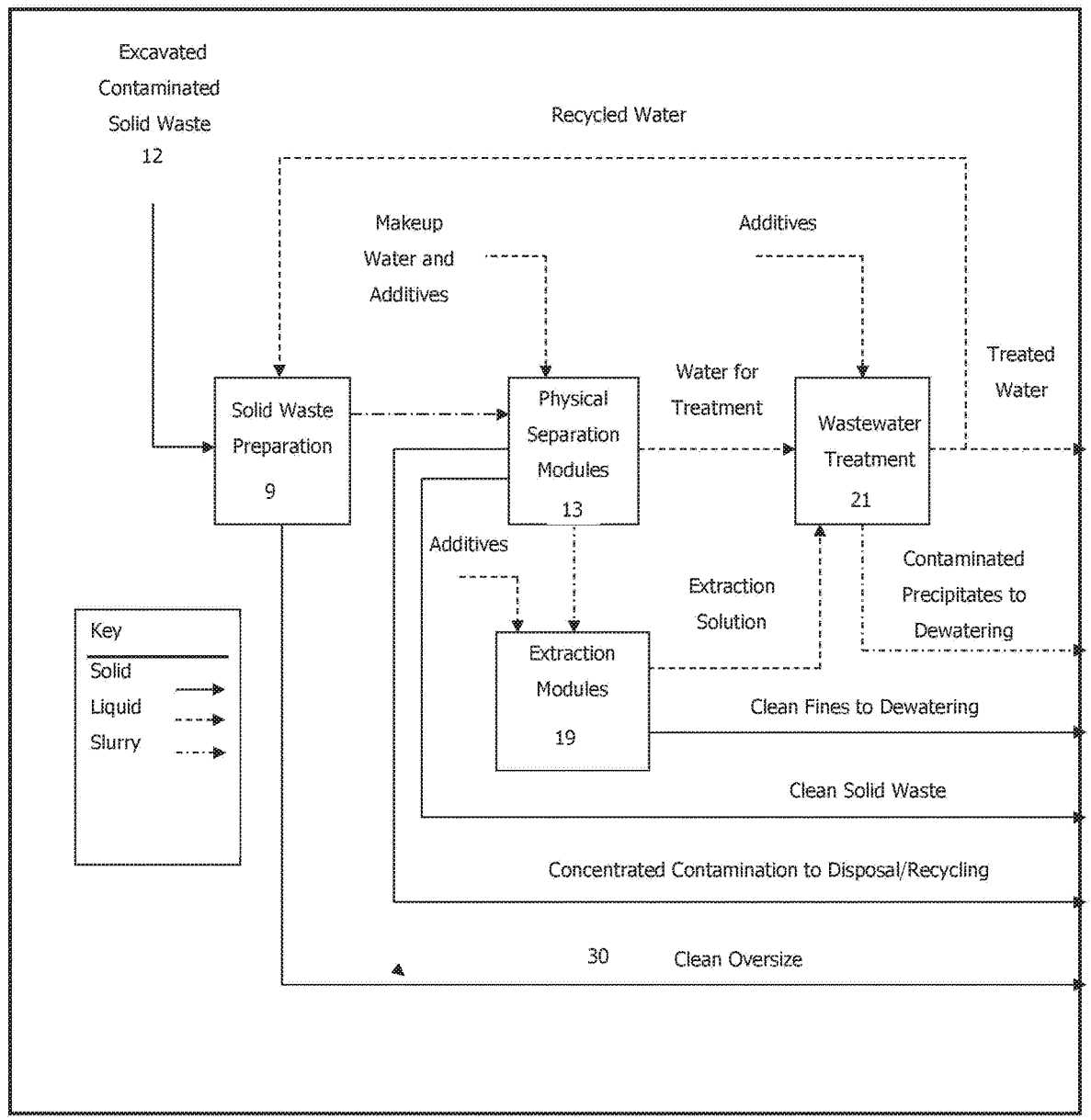
FIG. 1 is a process flow diagram depicting a solid waste treatment system and process according to the present invention.
Figure 2:
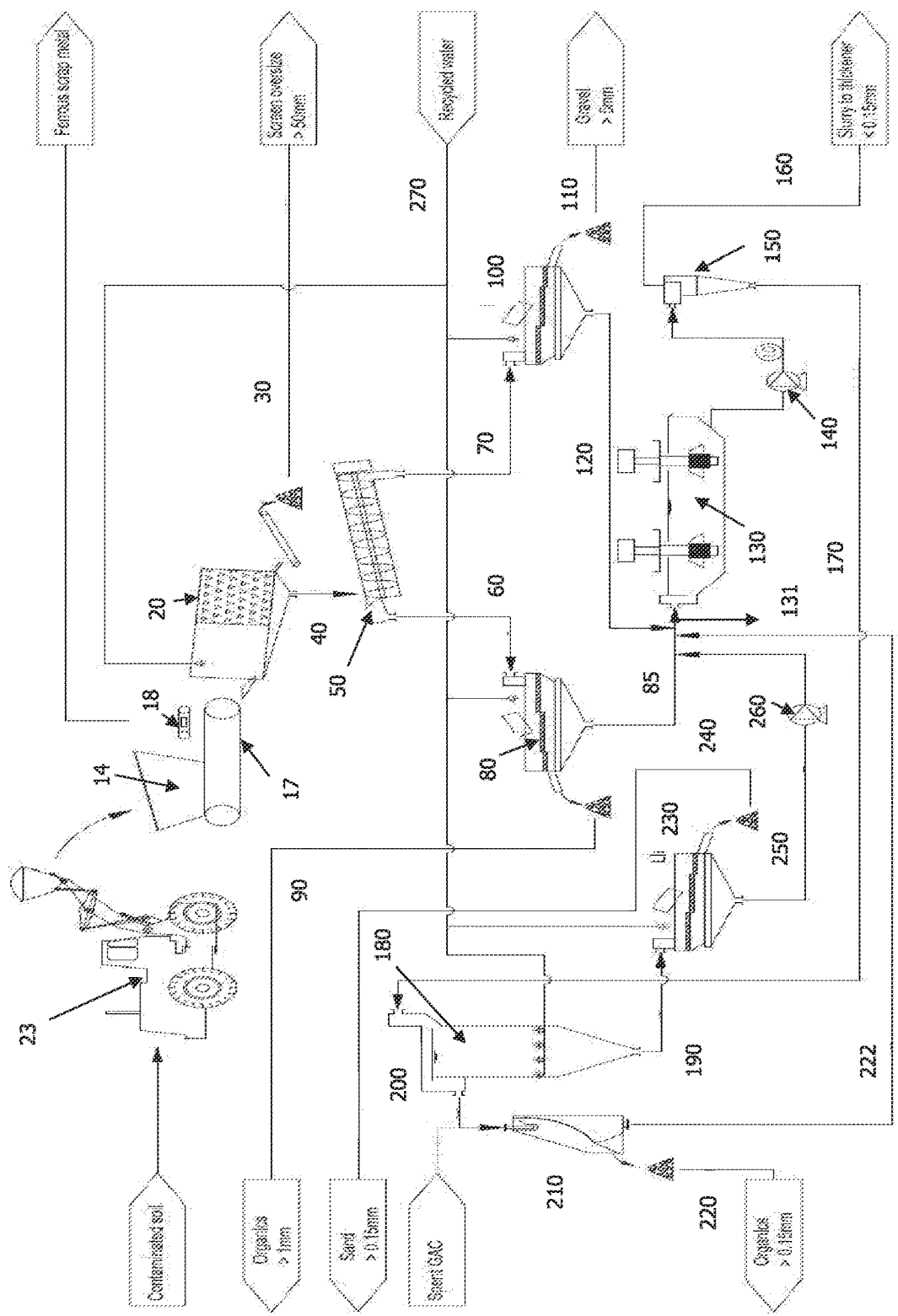
FIG. 2 is a schematic diagram depicting physical separation modules of the solid waste treatment system and process of FIG. 1.
Figure 3:
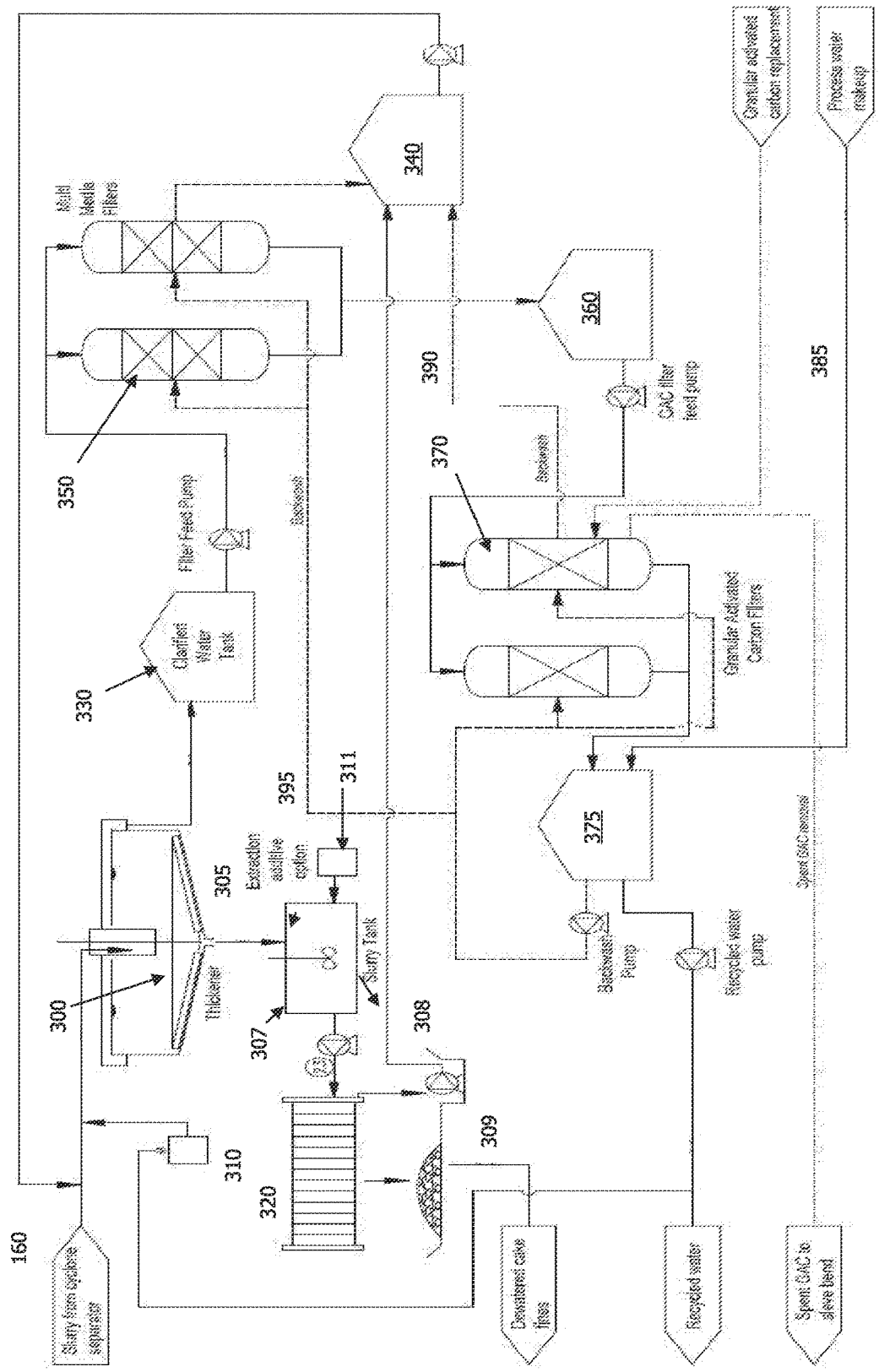
FIG. 3 is a schematic diagram depicting physical separation modules and extraction/chemical separation modules and a wastewater treatment circuit of the solid waste treatment system and process of FIG. 1.

There is disclosed herein a solid waste treatment system and process (FIGS. 1, 2 and 3). The waste treatment system and process provides a washing process that treats and separates per- and poly-fluoroalkyl substances (PFAS) contaminated bulk solid waste 12. Bulk solid waste including but not limited to, sediment, concrete or other solid waste material, The waste treatment system and process is a physical and chemical treatment train that incorporates size, density and chemical separation processes which will be discussed in detail below.

Referring to FIG. 1, a process flow diagram is provided which identifies the overall stages of the waste treatment system. The initial stage is solid waste 12 excavation followed by solid waste 12 preparation to remove oversize material.

Physical Separation Modules

The subsequent stage includes physical separation modules 13, which may use a variety of different equipment, as follows:

Size Separation Modules—particle size separations are conducted on the bulk contaminated solid waste 12 using physical or hydrodynamic separation techniques. Examples of equipment utilised includes multi deck screens, hydro-cyclones and rising current classifiers.

Density Separation Modules—particles with different densities respond differently to gravity and to one or more other forces applied simultaneously in opposition to gravity. Although density difference is the main criterion for gravity separation, particle size and shape also influence the separation. Utilising these techniques, contaminants with a density difference from the bulk solid waste 12 can be effectively separated and concentrated. Examples of equipment used in density separation include spirals and shaking tables.

Dewatering Modules—the dewatering modules are used to separate the wash water from the treated solid waste 12 and contaminated sludge. These modules allow the wash water to be recycled and utilised in a continuous closed loop process. Examples of dewatering equipment include filter presses and linear motion screens.

Within the physical separation modules, the process water can be heated or amended with chemicals to enhance the separation of the PFAS components from the solid waste 12.

It will be appreciated by those skilled in the art that the physical separation module may deploy alternative equipment than the equipment described above.

Extraction/Chemical Separation Modules

After processing through the physical separation modules 13, the remaining solid waste 12 is processed with extraction/chemical separation modules 19, which are as follows:

The leaching or extraction/chemical separation modules 19 differ from solid waste washing, physical separation modules 13, in that they employ a leachate or extractant to separate the contaminants from the bulk solid waste matrix 12. Like the physical separation modules 13, the extraction/chemical separation modules 19 provide a separation process that utilises an amended wash water to extract contaminants from the bulk solid waste 12.

Amendments within wash water may include acids, bases, surfactants, biosurfactants, solvents or specific solutions (for example those containing poly-valent cations) that are added to the water stream within the process to enhance the desorption of PFAS from solid waste into the wash water. The surfactants may be biological surfactants or cationic surfactants or anionic surfactants.

The wash water may also be corrected to an optimal pH range (typically 8-9 but dependent on soil characteristics) with an acid or base and may also be heated. Both pH correction and heating enhance PFAS desorption from solids.

However, it differs from solid waste washing in that the time within the extraction system is in the order of magnitude of hours (or greater) as opposed to minutes allowing for greater contact times and extraction efficiencies.

The technique operates on the principal that the contaminants will have a greater solubility in the wash water solution than in the solid waste or mineral matter matrix. The equilibrium concentration gradient drives the mass transport process such that the contaminant transfers from the solid waste to the wash water. When the solid waste is separated from the amended wash water, the contaminant concentrations present in the solid waste or mineral matrix are reduced relative to the concentrations prior to the extraction process.

Water Treatment Modules

The waste treatment system (FIGS. 1, 2 and 3) includes a wastewater treatment module 21 that is used to treat the contaminant affected process water and extraction solution and recycle the treated water in a closed loop process for the solid waste 12 washing circuit. The water treatment module 21 is designed specific to the contaminant being treated, but typically incorporates precipitation and filter polishing elements. The water treatment module 21 may also include equipment to generate deionised water which is effective at extracting PFAS from solids.

In the preferred embodiment, the different fractions in the solid waste 12 that are separated are as follows:

| | |
|---|---|
| Ferrous scrap metal | this comprises tramp ferrous metal objects that may be present in the bulk solid waste; |
| Oversize | material comprising mainly rocks > 50 mm in the bulk solid waste |
| Gravel | material comprising mainly stones with a fraction < 50 mm and > 5 mm; |
| Sand | material comprising mainly sand with a fraction < 5 mm and > 0.15 mm; |
| Fines | material comprising mainly silt and clays with a fraction < 0.15 mm; |
| Organics (1 mm) | material comprising mainly organic vegetation material such as sticks, grass leaves etc. with a fraction > 1 mm; and |
| Organics (0.15 m) | material comprising mainly organic vegetation material such as sticks, grass leaves etc. with a fraction < 1 mm and > 0.15 mm. However, it will be appreciated that finer grained organics with a fraction less than 0.15 mm may also be removed by flotation or other suitable processes. |

The waste treatment system (FIGS. 1, 2 and 3) operates on the principal that contaminants are associated with certain size fractions of a bulk solid waste 12 matrix and that these contaminants can be desorbed from solid waste, dissolved or suspended in an aqueous solution, removed by separating out clay and silt particles from the bulk solid waste 12 matrix, separated through physical differences between the contaminant and the solid waste 12 particles and/or destroyed using chemical amendments such as oxidants separated through the removal of specific components of the solid waste matrix 12 that the PFAS has preferentially partitioned. In some embodiments, additives may also be added to the wash water to enhance the separation between the contaminant and bulk solid waste 12. The pH of waste water may also be amended to an optimal value and/or the waste water may be heated.

As shown in FIG. 1, the first stage of the process involves solid waste 12 preparation. The process is designed to treat material up to about 1,200 mm in size.

Per the preferred embodiment described below, the bulk solid waste 12 is transported to a starting point of the system (FIGS. 1, 2 and 3). Referring to FIGS. 1 and 2, this may be conducted at the contamination site or alternatively at a remote location, and requires the excavated, contaminated bulk solid waste 12 to be physically delivered to the starting point of the system (FIGS. 1, 2 and 3).

This may be done using various types of earth moving and/or transportation equipment. In a preferred embodiment, contaminated bulk solid waste 12 is fed via a front end loader 23 into a feeder bin 14. However, it will be appreciated that other materials handing machinery may be deployed such as conveyor belts.

The feeder bin 14 is equipped with a grizzly screen, typically in the form of a static or vibrating screen. The grizzly screen separates large, coarse material from the bulk solid waste 12. Oversize material such as large boulders, are directed into a bunker and removed with the front end loader 23.

The grizzly screen is preferably defined by angled bars which slope downwardly toward the feed side. In a preferred embodiment, the bars are spaced at about 100 mm from adjacent bars. The grizzly screen preferably includes hungry boards or other such barriers to reduce lateral spillage. The grizzly screen is preferably hinged so that it can be flipped open for cleaning.

The feeder bin 14 is equipped with a feeder belt 17 that controls the feed rate of the bulk solid waste 12 into the waste treatment system. The feeder bin 14 also preferably includes a bin vibrator to manage and reduce material bridging. The drive unit for the feeder belt 17 is equipped with a variable frequency drive that is integrated with the control system allowing adjustment of the feed rate from a control panel, depending on bulk solid waste 12 input rates.

The feeder bin 14 is preferably lined with high density polyethylene (HDPE) to limit the amount of material bridging, and reduce blockages and obstructions.

A magnet 18, located above the feeder belt 17, removes ferrous tramp metal objects from the bulk solid waste 12 during transit along the feeder belt 17. Any collected ferrous metal objects are removed from the magnet 18 and deposited into a skip bin for recycling.

Rock and debris greater in size than this maximum limit are deemed oversize material 14 which is separated from the bulk solid waste 12 using the grizzly screen and/or other dry screening techniques. If required, the oversize material 14 is subsequently treated using a hand held high pressure water spray device to clean the surface of the oversize material 14.

On completion of the solid waste 12 preparation stage, once the oversize material 14 has been removed, the remaining bulk solid waste 12 is mixed with wash water and enters several different stages of the waste treatment system as described in detail below.

Referring to FIG. 2, after the initial solid waste 12 preparation and removal of oversize material 14, the bulk solid waste 12 is delivered by the feeder belt 17 to a rotating trommel 20, such as a wet trommel screen 20. However, it will be appreciated by those skilled in the art that other size dependent material screening devices can be utilised in place of the rotating trommel 20.

High pressure water is injected into the trommel screen 20. The purpose of the wet trommel screen 20 is to agitate the material under high pressure water jets to break up the solid waste 12 into its constituent components and then sieve out the oversize fraction 30. The clean oversize fraction 30, which is typically larger than 50 mm, is ejected from the back end of the trommel screen 20 into a bunker or other storage facility. The clean oversize fraction 30 is unlikely to be contaminated, and does not require any further processing.

The wet trommel screen 20 also separates the solid waste 12 into a gravel slurry output 40, which is generally under 50 mm.

The gravel slurry output 40 from the wet trommel screen 20 is delivered to a coarse material washer 50. The coarse material washer 50 provides a cleaning and scrubbing process which typically removes soluble clays and dust. In a preferred embodiment, a single or double Archimedean screw coarse material washer 50 is utilised. The Archimedean screw transfers the gravel and a portion of the sand and fines fractions up an incline in the coarse material washer 50. Fine sands, silts, clay and any organic fraction overtops a weir located at one end of the coarse material washer 50, and is transferred to a first liner screen deck 80.

The coarse material washer 50 has two outputs 60, 70. A first output 60 is in the form of a slurry including the organic fraction. A second output 70 is in the form of gravel and a portion of the sand and silt/clay. The gravel typically has a size of about 5 mm or above.

The organic material and slurry output 60 is fed into a first linear screen deck 80, such as a vibrating screen. The linear screen deck 80 separates the input slurry 60 into organic material 90, typically having a size larger than 1 mm, and slurry 85. The organic material 90 may be removed from the system at this point. The liquor with the organic material 90 (1 mm) from the first linear screen deck 80 is washed with high pressure water jets and is transferred into a skip bin or similar. The remaining undersize 85 and liquor is transferred to an attrition scrubber 130 as discussed below.

The gravel sand and silt/clay output 70 from the coarse material washer 50 is directed into a second linear screen deck 100, such as a vibrating screen. The second linear screen deck 100 separates the gravel 70 into two outputs in the form of gravel 110, having a size of about 5 mm or larger. The second output from the second linear screen deck 100 is in the form of a slurry 120. The liquor with the gravel/sand/fines fractions 110 from the second linear screen deck 100 is washed with high pressure water jets and the gravel is screened out and is transferred into a bunker. The remaining slurry containing undersize sand/fines fraction 120 and liquor is transferred to the attrition scrubber 130.

The slurry output 85 of the first linear screen deck 80 and the slurry output 120 of the second linear screen deck 100 converge before being fed into the attrition scrubber 130. The attrition scrubber 130 provides a high-shear mixing environment to separate clays and transfer to the aqueous phase other soluble impurities. In the preferred embodiment, the attrition scrubber 130 is a vessel, such as an induced flotation cell, that agitates the combined liquor streams to further disseminate the solid waste 12 particles. In one embodiment, the attrition scrubber 130 may be used as a flotation cell to also remove iron oxides.

The output from the attrition scrubber 130 is directed into a separator pump 140.

The output of the separator pump 140 is directed to a separator such as a cyclonic separator 150. The cyclonic separator 150 is calibrated such that it separates the sand fraction 170 from the fines. The sand liquor fraction 170 is pumped to a hindered settling classifier 180 whilst the fines slurry fraction 160, which is likely to contain contaminants, is pumped to a thickener 300. The fines slurry 160 generally has a particle size of 0.15 mm and smaller. The cyclonic separator 150 has an output typically in the range of 0.15 mm to 0.04 mm.

A further organics removal step is undertaken on the sand fraction within the hindered settling classifier 180. The hindered settling classifier 180 operates with teeter water added to create a density bed capable of further separation of organics. The rising teeter water and solids 200 with a settling rate lower than the teeter water are carried out of the top of the hindered settling classifier 180. The organics 200 and liquor are transferred to a sieve bend 210.

The liquor with the organics (larger than about 0.15 mm) 200 on the sieve bend 210 is screened by the sieve bend 210 with the organic fraction 220 transferred into a skip bin. The undersize 222 and liquor is transferred back to a location upstream of the attrition scrubber 130 as a recycle stream, being mostly water.

After settling into the dewatering cone of the hindered settling classifier 180, the sand fraction slurry 190 is removed via the bottom vessel outlet. The sand fraction slurry 190 and liquor, being approximately 50% water and 50% solid, are transferred to a third linear screen deck 230.

The sand fraction slurry 190 from the hindered settling classifier 180 is directed to a third linear screen deck 230. The liquor with the sand fraction slurry 190 from the third linear screen deck 230 is washed with high pressure water jets and the sand 240 is screened out and is transferred into a bunker. The remaining undersize fraction 250 and liquor are transferred back to the attrition scrubber 130 as a recycle stream.

A water source 270, such as recycled water, is supplied to the system. The water 270 is provided to various treatment sites within the system, including the wet trommel screen 20, the first, second and third linear screen decks 80, 100, 230, and the hindered settling classifier 180.

Referring to FIG. 3, the fines slurry 160 from the cyclonic separator 150 enters a thickener 300 which is used to clarify the water and thicken the fines 160. Fines slurry 160 flows through a de-aeration vessel before entering the launder to the thickener 300 well. The thickener 300 may be equipped with a mechanical sludge rake, moving sludge along a sloped bottom to a central sludge outlet 305.

Preferably a drive motor of the thickener 300 is located at the centre, stilling well and is accessible via a walkway. Motor speed for the thickener 300 may be controlled via a variable frequency drive with torque limiting functionality.

Polymer 310, (for example polydiallyldimethyl ammonium chloride (polyDADMAC) or non-ionic polyacrylamide based polymers) may be added to the inlet launder of the thickener 300 to assist in clarification and fines thickening in a sludge blanket.

The polymer 310 is normally injected into the launder leading up to the stilling well of the thickener 300. The polymer 310 dosing rate is preferably controlled via an automatic sampler. Automatic feedback from the auto sampler to adjust chemical pump speed is required to control polymer 310 dosing rates.

The clarified water from the thickener 300 overflows the effluent launder and is transferred into a clarified water tank 330.

The thickened fines slurry is delivered to a slurry tank 307 from the thickener 300 before being pumped into a plate and frame press or similar e.g. vacuum filter press, belt press, centrifuge etc. An extraction additive (for example an acid or base) 311 may be added to the slurry tank.

The slurry dewaters against the filter cloth in the press 320 and water is expelled into a sump 308. This filtrate water is pumped with pump 309 to a filtrate water tank 340 from where it is recycled to a location upstream of the thickener 300.

Once the dewatering cycle of the plate and frame press 320 is complete, the press 320 is opened and the dewatered fines cake is discharged into a skip bin. The dewatered fines cake typically retains higher residual levels of PFAS than the coarse fractions however the removal efficiency is dependent on the specifics of the feed material being treated.

Water from the clarified water tank 330 undergoes water treatment. It will be appreciated by those skilled in the art that the water treatment system described herein may be replaced with alternative water treatment systems. Water is pumped to one or more primary filters in the form of multi-media filters 350 to remove residual suspended solids.

The filtered water from the multi-media filters 350 is discharged into a filtered water tank 360. After filtration, the water is pumped through at least one secondary filter in the form of a granular activated carbon (GAC) filter 370 (or other selected media filter) to remove the dissolved PFAS or other organic contaminants.

On the outlet side of the GAC filters 370, water is stored in a treated water tank 375. From the treated water tank 375, the treated water 270 is pumped back to the system as a recycle stream as described earlier. Reverse osmosis or similar may be used to generate de-ionised water for reuse as process water within the system, due to deionised water's effectiveness at extracting PFAS from solids.

The filtration system is set up so that both GAC filters 370 and/or multi-media filters 350 can be backwashed. Backwash water is pumped with a dedicated pump to the filtrate water tank 340, through lines 390, 395 for reprocessing at the head of the thickener 300.

Additional water may be input into the system through the line 385.

During processing of the bulk solid waste 12, contaminants may be separated from the bulk solid waste 12 in the following different forms:
1. Water-soluble contaminants are transferred to the wash water;
2. Insoluble contaminants are suspended as particulate in the wash water;
3. Clay and silt particles to which contaminants are adhered are separated from the larger solid particles;
4. Contaminants are separated and concentrated and/or destroyed from the bulk matrix based on physical or chemical differences; and
5. Water soluble contaminants are adsorbed on granular activated carbon that is disposed of.
6. Separated through the removal of specific components of the solid waste matrix 12 that the PFAS has preferentially partitioned.

The water-soluble contaminants transferred to the wash water and contaminant suspended as particulate in the wash water are sent to the wastewater treatment circuit where these contaminants are removed from the water as "residuals" and dewatered. The treated water is typically recycled back to the solid waste 12 washing system for further treatment of solid wastes.

After the larger solid waste particles are washed and removed, the fines (day and silt particles) are typically sent for additional treatment, and eventually to the dewatering modules where the free water is removed and reused. The treated solid waste is stockpiled and analysed to confirm that the post-treatment environmental solid waste quality objectives have been met. The concentrated contaminants and the dewatered residuals from the wastewater treatment circuit are prepared either for off-site disposal or recycling/reuse at an appropriately licensed facility.

The actual configuration of the solid waste washing process will be determined based on the treatability testing.

The waste treatment system separates the input bulk solid waste 12 into oversize, gravel, sand, fines and two organic fractions (>1 mm and 0.15-1 mm);

Advantageously, the waste treatment system enables the desorption of PFAS from solid waste to water and the adsorption of PFAS onto an adsorbent media in the water circuit.

FIGS. 2 and 3 conceptually depict the hydraulic gradient through the waste treatment system. Material is expected to cascade via conveyor belts or gravity from the feeder bin 14 to the attrition scrubber 130. Beyond the attrition scrubber 130, the circuit is pressurised with pumps allowing the organics (0.15 mm) and sand circuits to be raised and flow under gravity.

It is envisaged that variations may be made to the waste treatment system as follows:
- A magnet 131 may be installed near the input to the attrition scrubber 130 to separate ferrous material;
- The screening size of materials;
- The ratio of wash water to solid waste 12;
- The size of solid waste 12 particles that will enter the water treatment process;
- Chemicals, temperature, retention time;
- The polymer used to remove solids from the liquid stream;
- Polymers or other electrochemical processes could also be used to remove PFAS contamination directly from the liquid stream;
- The water treatment process depicted is generic and many other water treatment processes could potentially be substituted, achieving the same or better outcomes (including technologies such as foam fractionation, which removes PFAS from water as a foam stream);
- Numerous other adsorbents (powdered activated carbon, modified day, polymers, ion exchange resins) or alternative water treatment technologies (reverse osmosis, nano-filtration) may be used to remove PFAS from the liquid stream; and
- The fines thickening and dewatering process is also generic. Alternative dewatering devices such as belt filter presses and/or vacuum filters are possible.

Advantageously, the system enables the treatment of multiple contaminant types within one treatment system.

Advantageously, the process includes a three-step process for removal of organic material (i.e. removal within a linear screen deck and the hindered settling classifier and DAF or flotation cell).

Although the invention has been described regarding specific examples, it will be appreciated by those skilled in the art that the invention may be embodied in many other forms.

What is claimed is:

1. A waste removal system for removing per-fluoroalkyl and poly-fluoroalkyl substances (PFAS) from bulk solid waste, the system comprising:

a preparation module having a bulk material separator to separate oversize material from the bulk solid waste;

a physical separation module, located down-stream of the preparation module, to separate the bulk solid waste based on particle size one or more separation techniques selected from physical, hydrodynamic, and density separation techniques;

an extraction module, located downstream of the physical separation module, to add leachate and/or extractant to separate contaminants including the PFAS from a slurry output from the physical separation module, into a fines output and a contaminated water solution including the contaminants; and a water circulation system for supplying supply water to the preparation module, the physical separation module and the extraction module, the water circulation system including at least one water treatment system, the at least one water treatment system including a slurry dewaterer for producing dewatered fines cakes having a portion of the PFAS and a granulated activated carbon (GAC) filter for removing a remainder of the PFAS from dewaterer-expelled water, treated water from the at least one water treatment system being recycled and recirculated within the waste removal system as a portion of the supply water.

2. The waste removal system of claim 1, wherein the physical separation module is configured for heating the supply water, amending the supply water with one or more chemicals, or both.

3. The waste removal system of claim 1, wherein the extraction module is configured for heating the supply water, any chemicals used in the extraction module, or both.

4. The waste removal system of claim 3, wherein the extraction module is configured for using chemicals selected from surfactants, biosurfactants, solvents, and poly-valent cations.

5. The waste removal system of either of claim 3, wherein the system is configured to supply water to the extraction module which is pH modified.

6. The waste removal system of claim 5, wherein the pH is in a range of 8-9.

7. The waste removal system of claim 1, further comprising reverse osmosis technology for generating de-ionized water for use as the supply water.

* * * * *